March 10, 1953 — A. H. KIBIGER — 2,631,204
SWITCH ACTUATING MEANS
Filed April 1, 1949 — 2 SHEETS—SHEET 1
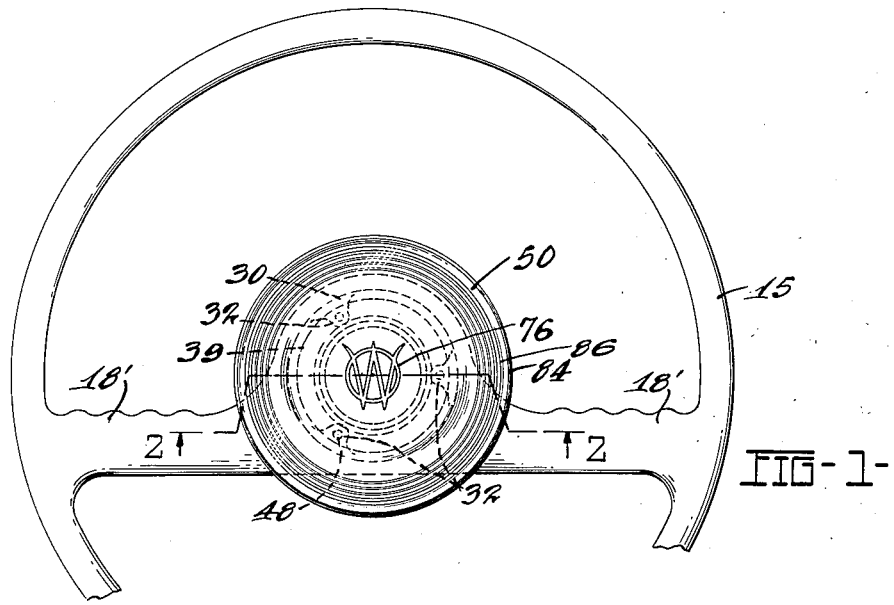
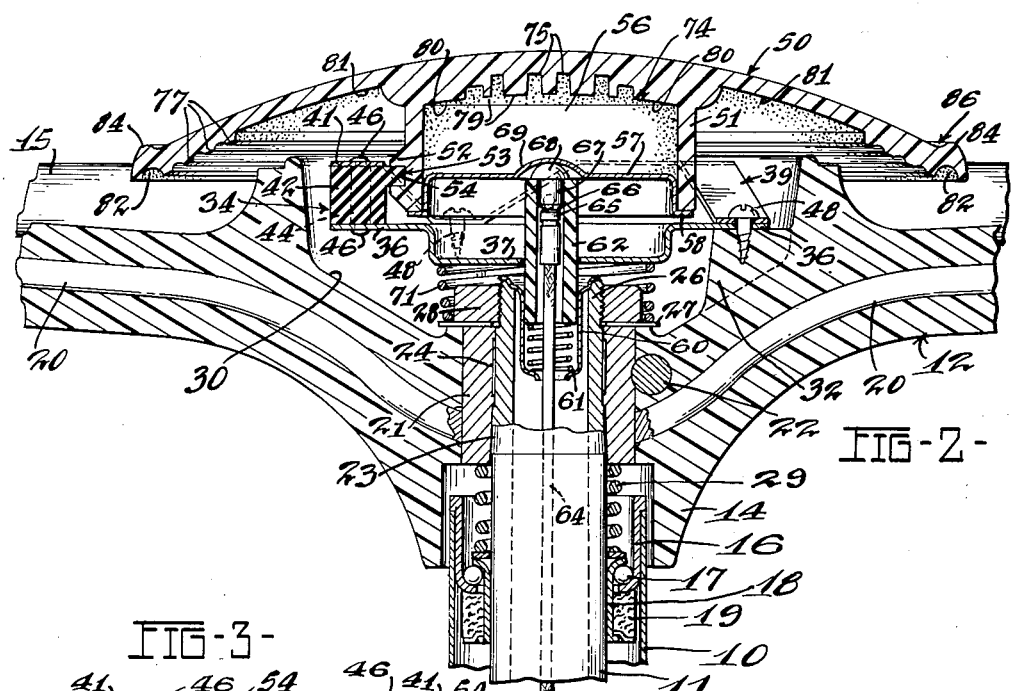
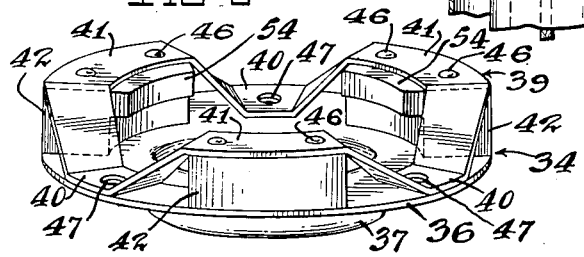
INVENTOR:
ARTHUR H. KIBIGER.
BY
Harry O. Ernsberger
ATTY.

March 10, 1953 — A. H. KIBIGER — 2,631,204
SWITCH ACTUATING MEANS
Filed April 1, 1949 — 2 SHEETS—SHEET 2
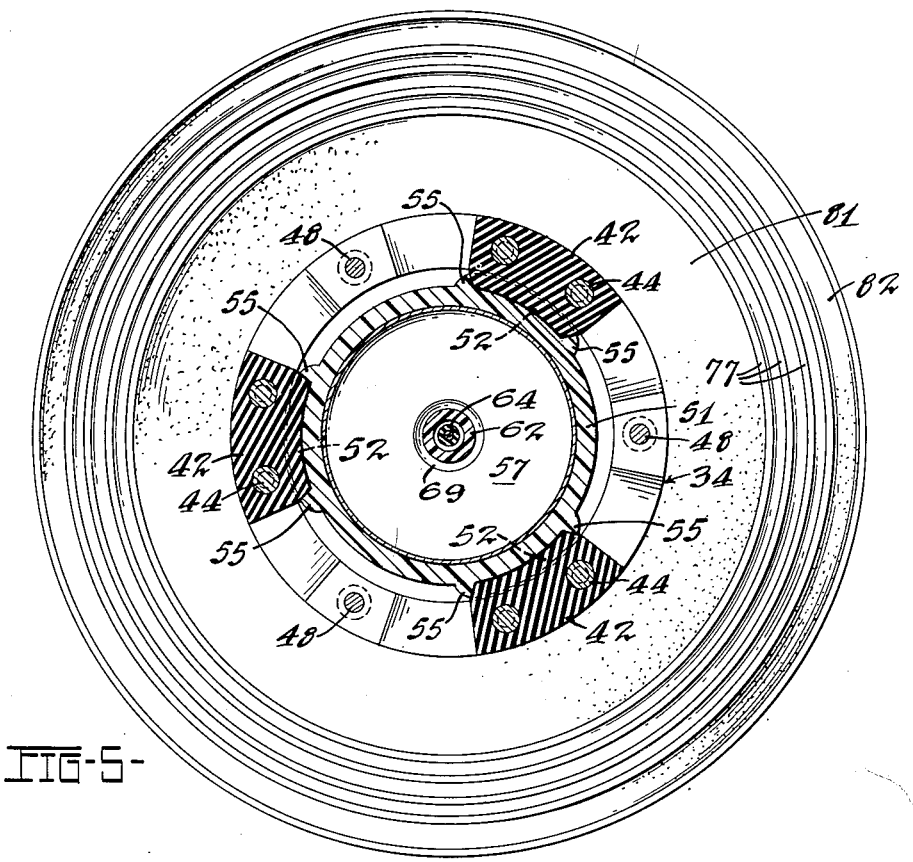
FIG-5-
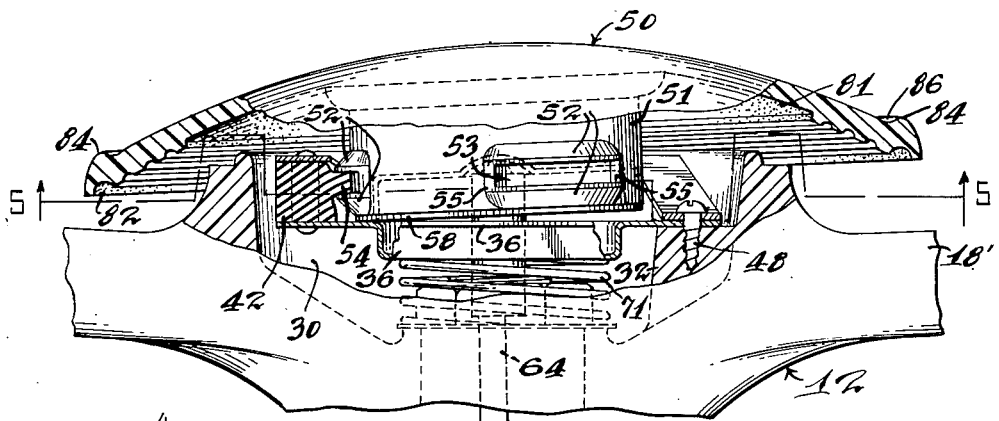
FIG-4-
INVENTOR:
ARTHUR H. KIBIGER.
BY Harry O. Ernsberger
ATTY.

Patented Mar. 10, 1953

2,631,204

UNITED STATES PATENT OFFICE 2,631,204

SWITCH ACTUATING MEANS

Arthur H. Kibiger, Toledo, Ohio, assignor to Willys-Overland Motors, Inc., Toledo, Ohio, a corporation of Delaware Application April 1, 1949, Serial No. 84,918

1 Claim. (Cl. 200—59)

This invention relates to improvements in manipulating devices for use in manually closing switches of electrical circuits and more especially to a relatively movable member carried by the steering wheel assembly of an automotive vehicle for manually closing a circuit to energize a signal device as for example, a horn or audible sound producing device.

In connection with circuit closing devices heretofore used on automotive vehicles for energizing a horn or audible signal, comparatively small buttons axially disposed with respect to the steering post have been used. Another form of conventional circuit closing device embodies a member axially aligned with the steering post having radially extending arms supporting an annulus or ring in juxtaposition with the periphery of the steering wheel. These prior constructions have certain disadvantages which have been a source of annoyance to vehicle operators. For example, in order for the operator to depress the button arranged centrally of the steering wheel, he must remove his hand from the steering wheel to do so. In operating the annulus or ring type actuator, the ring must be depressed a considerable distance to effect the closing of the switch. Furthermore, such ring construction is expensive to manufacture and presents an obstruction which ofttimes is inadvertently depressed and interferes with the facile use of the steering wheel by the operator.

The present invention has for an object the provision of a circuit closing device especially adapted for use and assembly with a vehicle steering wheel wherein the circuit closing means may be easily and quickly operated or manipulated with a minimum of effort and movement of the hand of the operator.

Another object of the invention resides in the provision of a circuit closing device for vehicle horns or signals associated with a vehicle steering wheel having laterally arranged grip bars or spokes, the device being especially configurated and arranged to be operated by slight pressure of the thumb of the operator without necessitating the removal of the operator's grip upon the bar of the steering wheel.

Another object of the invention is the provision of a horn or signal circuit closing device centrally disposed with respect to the vehicle steering wheel and configurated to be advantageously manipulated by the thumb of the vehicle operator, the configuration of the means including an annular portion fashioned so as to minimize tendency for the thumb to slip from the manipulating means.

Still another object of the invention resides in the provision of a manipulating member adapted to be depressed to circuit closing position for energizing a horn or other electrically energizable unit which presents a minimum of obstruction, permitting free movement of the arms and hands of a vehicle operator and is not liable to be inadvertently depressed by the operator during rotative movements of the steering wheel.

Still another object of the invention resides in the provision of a circuit closing member for assembly with a vehicle steering wheel arrangement which may be formed of material having light transmitting characteristics and which may be configurated to present attractive designs or characters and the designs or characters coated to present combinations of contrasting colors and present the designs in distinctive relief.

Another object of the invention resides in the provision of a horn button or signal circuit closing member which may be easily and quickly manufactured by molding processes from thermoplastic or thermosetting polymeric resins and which may be configurated with various designs to present a pleasing and attractive appearance.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a plan view of a steering wheel and the signal actuating member of the invention;

Figure 2 is a vertical sectional view through the steering wheel, steering post and signal actuating means, the section being taken substantially on the line 2—2 of Figure 1;

Figure 3 is an isometric view showing the arrangement supporting the signal actuating member;

Figure 4 is an elevational view of a portion of the steering wheel and signal actuating member and mounting means therefor, certain parts being shown in section; and Figure 5 is a detail sectional view taken substantially on the line 5—5 of Figure 4.

Referring to the drawings in detail, there is illustrated a vehicle steering column or post 10 in the form of a tube which encloses a shaft 11 to the upper end of which is connected a steering wheel 12, the lower end being connected to suitable steering gear mechanism (not shown). The steering wheel 12 has a central hub portion 14 which is telescopingly disposed with respect to the upper end of the post or tube 10 as shown in Figure 2. A cup-like member 16 is carried by the post 10 and encloses an antifriction or ball type bearing 17, the bearing balls cooperating with an inner race 18 disposed adjacent the shaft 11. A dust protecting bushing 19 of felt or other material protects the bearing 17 from foreign matter.

The steering wheel 12 is preferably formed with an annular portion or rim 15 integrally connected to the hub 14 by a pair of laterally extending grip bars 18, the structure being molded of resinous plastic material as for example, tenite or similar material. Integrally molded with the hub portion thereof is a metal bushing 21. The molded resin of the wheel assembly is reinforced by a core structure 20 of steel wire or rod embedded in the resin. The upper end of the shaft 11 is formed with a taper 23 and a serrated portion 24 the serrations extending in a longitudinal direction and which fit with reciprocal serrations formed on the interior wall of the bushing 21 so as to prevent relative rotation between the steering wheel 12 and the supporting shaft 11. The upper end portion of the shaft 11 is formed with a threaded tenon 26 to accommodate a washer 27 and a securing nut 28. An expansive coil spring 29 serves to maintain the elements of the antifriction bearing 17 in proper position and in assembled condition.

The upper central portion of the steering wheel 12 is formed with a hollow chamber 30 adapted to accommodate the elements or members of the switch or circuit closing means for energizing the audible signal or horn (not shown). The interior walls of the chamber 30 are formed with integral projections 32, there being three projections in the embodiment illustrated, which support a component assembly 34 of the switch mechanism illustrated per se in Figure 3. The switch unit 34 is inclusive of a bottom plate 36 having a circular recessed or depressed central portion 37. Supported upon the plate 36 is a sheet metal annulus 39 of undulated configuration as shown in Figure 3, this configuration being inclusive of a plurality of spaced portions 40 being in contact with the plate 36 the intermediate sections between adjacent uniplanar portions being raised to form lands 41. Positioned between the lands 41 and the plate 36 are three members or blocks 42 preferably formed of rubber of a semi-rigid character affording a limited degree of resilience for a purpose to be hereinafter explained. The blocks 42, the plate 36 and the lands 41 are provided with openings to receive spacing members or rivets 44 which extend through said openings, the ends of the members 44 being swaged or riveted over as at 46 so as to retain the blocks 42, the annulus 39 and plate 36 in a unitary assembly as shown in Figure 3. The portions 40 of the annulus 39 and the plate 36 are provided with aligned openings 47 to receive screws 48 for securing the unit 44 in fixed engagement with the projections 32 integrally formed on the steering wheel 12.

The movable unit of the circuit closing arrangement of my invention includes an element or manipulating portion 50 formed with a depending annular flange portion 51. The portion 51 is integrally formed with several radial projections 52 which are arranged in pairs circumferentially spaced as shown in Figure 5. The projections of each pair or set are spaced vertically as shown in Figures 2 and 4 to form a channel 53 arranged to receive and accommodate inwardly extending projections or tongues 54 formed on the rubber blocks 42. The ends of each of the channels 53 are bounded by abutments 55 as shown in Figure 5 which serve to retain the tongues 54 in the channels 53 so as to hold the unit 34 in assembled relationship with the element or manipulating portion 50.

The depending annular flange 51 of element 50 provides a chamber 56 within which is disposed a cup-like metal member 57 formed with a laterally extending flange 58 which bears against the lower extremity of the flange 51 to position the member 57 with respect to the manipulating portion 50 as shown in Figure 2. Disposed within the upper hollow portion of the tube 11 is a thimble-like member 60 enclosing an expansive coil spring 61 which is disposed beneath a sleeve or bushing 62 formed of insulating material such as hard rubber or the like. Disposed within the hollow interior of the post 11 and the bushing 62 is a current conducting cable 64 covered with insulating material and provided at its upper end with a terminal 65, the terminal being configurated with a recess 66 for snap interengagement with a hollow metal member 67 with a rounded head or terminal 68 which cooperates with a concave portion 69 formed on the cup-like metal member 57. By this means a circuit is established from a storage battery or supply of electrical energy (not shown) through the cable 64, terminal 65, member 67, head 68 and to the cup-like member 57.

The plate 36 is electrically connected to the washer 27 and shaft 11 by means of an expansive coil spring 71 in order to establish a return or ground circuit from the vehicle frame through the shaft 11 and plate 36. Circuit closing engagement for energizing the horn or signal is had by depressing the manipulating portion 50 to bring some zone or portion of flange 58 into metallic contact or engagement with an adjacent zone of plate 36 to complete a circuit. The tongues 54 formed on the resilient blocks 42 are of sufficient resiliency to permit relative downward movement of the depending flange 51 on the cup-like member 57 until the flange 58 on the latter engages the plate 36. Immediately upon release of pressure upon the manipulating portion or element 50 the resilient tongues 54 return the parts to their normal or open circuit positions as shown in Figure 2.

The manipulating member 50 is preferably formed or molded of a resinous plastic such as Lucite or the like which is polymethylmethacrylate, or member 50 may be formed of cellulose acetate, cellulose acetate butyrate, polystyrene, or the same may be formed of any rigid thermoplastic or thermosetting polymeric resin. In the form illustrated I have found that attractive designs may be incorporated as a part of the manipulating member when the same is made of transparent or translucent resinous material, coated or modified in certain portions to present reflective or colored portions. With particular reference to Figures 1 and 2 the central circular portion 74 is formed with recesses 75 forming a design or letters 76 as shown in Figure 1. Near the periphery of the manipulating member 50, the lower surface thereof is designed or configurated with a plurality of circular lands 77 which when viewed through the transparent or transluscent body of member 50 appear as a series of concentric bands. The design at the central section of member 50 lends itself to the adaptation of different colors so as to present an attractive appearance. For example, the recesses 75 may be coated or plated with gold leaf while the lands 79 arranged between the recesses 75 may be coated with red material, the surface 80 bounding the central design may be coated with a black background and the adjoining surfaces 81 coated with silver. All of the colored coatings above mentioned are preferably backed with a black coating so as to protect the color or reflective material placed directly upon the lower surface of the member 50 as well as to enhance the light reflective characteristics of the coated or plated zones. The lower peripheral zone of the member 50 is formed with a circular recess 82 plated or coated with silver or the like which serves to visually delineate the periphery of member 50 with respect to the adjacent light transmitting portions thereof.

The upper surface of the peripheral zone of member 50 is formed with a raised annular bead or ridge 84 which joins the upper convex surface 85 of member 50 by means of a shallow depression 86 as clearly shown in Figure 1. This construction facilitates the manipulation of member 80 by the vehicle operator to close the circuit to energize the horn or signal in that the operator normally grasping the steering wheel spokes or grip bars 18 need only place the thumb of either hand over the ridge 84 in the shallow annular channel 86 to tilt and depress the member 50 causing some portion of the flange 58 of member 57 to engage with the plate 36 to complete an electrical energizing circuit. The peripheral zone of the member 50 is spaced above the grip bars 18 a sufficient distance to permit depression of the member to circuit closing position without interference with the bars or spokes 18. Through this arrangement, the safety of vehicle operation is enhanced as it becomes unnecessary for the operator to remove his hands from the grip bars 18 of the steering wheel in order to close the horn or signal circuit. It is to be noted that the member 50 is of a diameter sufficient to overlie and extend beyond the central hub structure of the steering wheel so as to place the periphery of the member 50 in convenient operating position with respect to the grip bars 18 of the steering wheel. The member 50 being of circular configuration is at all times in a position to be instantly depressed irrespective of the relative turning movement of the steering wheel. Furthermore, the member 50 having a smooth central surface, devoid of projections and the like, presents a configuration which minimizes the liability of inadvertently depressing the member during rotative movements of the steering wheel.

The designs illustrated on the lower surface of the member 50 are merely illustrative and exemplary, it being understood that I contemplate the employment of various designs, configurations and colors, and different combinations of colors without departing from the spirit of the invention.

It is apparent that, within the scope of the invention, modifications and different arrangements may be made other than is herein disclosed, and the present disclosure is illustrative merely, the invention comprehending all variations thereof.

What I claim is:

A signal switch manipulating means for use with a steering wheel having transversely arranged grip bars connecting a hub portion with a rim portion of the wheel; said switch manipulating means including a circular disk-like member disposed above and in axial relation with said steering wheel, said member having its upper surface of convex configuration bounded by a raised peripheral ridge; said member having a depending annular flange portion resiliently supported by the steering wheel hub portion, and switch contacts respectively carried by the hub portion and said member whereby depression of the latter effects a closing of the switch means.

ARTHUR H. KIBIGER.

REFERENCES CITED

The following references are of record in the file of this patent:

UNITED STATES PATENTS

| Number | Name | Date |
|---|---|---|
| 1,913,026 | Graff | June 6, 1933 |
| 1,983,195 | Seiler | Dec. 14, 1934 |
| 2,065,611 | Pulleyblank | Dec. 29, 1936 |
| 2,244,565 | Nast | June 3, 1941 |
| 2,354,857 | Gits et al. | Aug. 1, 1944 |
| 2,376,305 | Bauer | May 15, 1944 |
| 2,454,242 | Wharem et al. | Nov. 16, 1948 |